United States Patent
Simonis et al.

(10) Patent No.: US 10,343,760 B2
(45) Date of Patent: Jul. 9, 2019

(54) HYBRID AIRSHIP WITH A FLEXIBLE COMPARTMENTED EXTERIOR ENVELOPE

(71) Applicant: SONACA S.A., Gosselies (BE)

(72) Inventors: Alexandre Simonis, Flemalle (BE); Yann Gonze, Belgrade (BE); Etienne Bargeton, Forest (BE)

(73) Assignee: SONACA S.A., Gosselies (BE)

( * ) Notice: Subject to any disclaimer, the term of this patent is extended or adjusted under 35 U.S.C. 154(b) by 419 days.

(21) Appl. No.: 15/391,126

(22) Filed: Dec. 27, 2016

(65) Prior Publication Data

US 2017/0183073 A1    Jun. 29, 2017

(30) Foreign Application Priority Data

Dec. 29, 2015 (BE) .................................. 2015/5849

(51) Int. Cl.
*B64B 1/62* (2006.01)
*B64B 1/02* (2006.01)
*B64B 1/30* (2006.01)

(52) U.S. Cl.
CPC ................. *B64B 1/62* (2013.01); *B64B 1/02* (2013.01); *B64B 1/30* (2013.01); *B64B 2201/00* (2013.01)

(58) Field of Classification Search
CPC .... B64B 1/62; B64B 1/02; B64B 1/30; B64B 2201/00
See application file for complete search history.

(56) References Cited

U.S. PATENT DOCUMENTS

| 1,762,845 A | 6/1930 | Upson |
| 3,446,457 A * | 5/1969 | Struble, Jr. ............... B64B 1/40 244/30 |

(Continued)

FOREIGN PATENT DOCUMENTS

| DE | 102007019141 A1 | 1/2009 |
| EP | 1770009 A2 | 4/2007 |
| WO | 2013041820 A1 | 3/2013 |

OTHER PUBLICATIONS

International Search Report for BE 201505846 dated Aug. 23, 2016.

*Primary Examiner* — Justin M Benedik
(74) *Attorney, Agent, or Firm* — Pearne & Gordon LLP

(57) ABSTRACT

A hybrid airship has both aerostatic and aerodynamic lift comprising: an engine, a flexible external envelope (2) and at least one primary enclosure Ep filled with lifting gas (G). The primary enclosure Ep having an elastic wall $P_1$ separating this enclosure from compartment $C_1$, the latter having an elastic wall $P_i$ separating compartment $C_1$ from compartment $C_i$, the latter having an elastic wall $P_{i+1}$ separating the compartment $C_i$ from compartment $C_{i+1}$, and so on up until elastic wall $P_{J+1}$ separating compartment $C_J$ from compartment $C_{J+1}$ where J corresponds to a whole number greater than or equal to 1, each compartment $C_i$ being equally delimited by the flexible exterior envelope. The hybrid airship includes a) a valve $V_i$ between each compartment $C_i$ and its adjacent compartment $C_{i+1}$, and b) a controller (22) for the valve $V_i$.

15 Claims, 9 Drawing Sheets

(56) References Cited

U.S. PATENT DOCUMENTS

| | | | | |
|---|---|---|---|---|
| 5,449,129 | A * | 9/1995 | Carlile | B64B 1/24 244/26 |
| 6,315,242 | B1 * | 11/2001 | Eichstedt | B64B 1/02 244/125 |
| 6,805,319 | B2 * | 10/2004 | Senepart | B64B 1/70 244/128 |
| 7,841,561 | B2 * | 11/2010 | Nachbar | B64B 1/04 244/125 |
| 2009/0200417 | A1 * | 8/2009 | Mitchell | B64B 1/04 244/30 |
| 2009/0314879 | A1 | 12/2009 | Kwok et al. | |
| 2015/0076279 | A1 | 3/2015 | Nelson | |

* cited by examiner

HYBRID AIRSHIP WITH A FLEXIBLE COMPARTMENTED EXTERIOR ENVELOPE

FIELD OF INVENTION

The present invention relates to the airship domain, particularly that of a hybrid airship providing aerostatic lift and aerodynamic lift, and capable of transporting a useful payload.

DISCUSSION OF PRIOR ART

Prior art essentially deals with airships providing aerostatic lift and in which the lift depends on the volume of a light gas carried on-board, as well as its degree of compression. The light gas is known as the lifting gas.

With this type of airship, the variation in altitude is effected by controlling the level of compression of the volume of the light gas, often helium. The greater the compression, the less lift is produced.

This principle is described for example in document WO2013/041820. However, this type of solution requires a compressor and a great deal of energy in order to vary the level of compression of the helium volume.

SUMMARY OF THE INVENTION

To overcome at least in part these disadvantages, the object of the present invention is a hybrid airship providing aerostatic lift and aerodynamic lift, and comprising:
 a means of propulsion
 a flexible exterior envelope
 at least one primary enclosure filled with a lifting gas, said primary enclosure Ep having an elastic wall $P_1$ separating this enclosure from a compartment $C_1$, the latter having an elastic wall $P_1$ separating compartment $C_1$ from compartment $C_i$, the latter too having an elastic wall $P_{i+1}$ separating compartment $C_i$ from compartment $C_{i+1}$, and so on up until an elastic wall $P_{J+1}$ separating compartment $C_J$ from compartment $C_{J+1}$ where J corresponds to a whole number greater than or equal to 1, each compartment $C_i$ being equally bounded by the exterior flexible envelope;
 a means of communication $V_1$ between each compartment $C_i$ and its adjacent compartment $C_{i+1}$;
 a means of control of the means of communication $V_i$;
 said means of control being configured so as to:
 (a) during an ascent phase with the lifting gas retained by one of the walls $P_i$ with i anywhere between 1 and J, it maintains the means of communication $V_i$ in a closed configuration so that the lifting gas, expanding with the altitude, exercises on wall $P_i$ a pressure capable of producing an elastic deformation of wall $P_1$ from its nominal position to a maximum deformation position in which it flattens against wall $P_{i+1}$ and reduces the volume of compartment $C_i$ substantially to zero, by the evacuation of the air initially occupying this said compartment $C_i$;
 (b) then when wall $P_i$ is in a position of maximum deformation, to open the means of communication $V_i$ in such a way that wall $P_i$ returns to its nominal position, by an automatic re-balancing of the pressure of the lifting gas on both sides of this wall $P_i$;
 (c) then, where appropriate, during continuation of the ascent phase and after the return of wall $P_i$ to its nominal position, to repeat actions (a) and (b) for wall $P_{i+1}$ as many times as necessary and as long as i remains less than or equal to J.

The invention thus has the characteristic of combining aerostatic lift with aerodynamic lift. Due to the aerodynamic lift, it is no longer necessary to act upon the compression of the lifting gas to control the altitude of this hybrid airship. The proposed solution permits, an astute management of the expansion phenomenon of the lifting gas with altitude, by providing a design having several compartments into which the lifting gas can progressively penetrate one by one, during the ascent phase of the airship.

Consequently, the airship does not require a lifting gas compressor as in prior art, and the means of propulsion employed are less energy-intensive than this type of compressor.

Moreover, being essentially constructed of flexible elements, it is less bulky when on the ground, when emptied of its air and lifting gas. This provides ease of transport of the airship. It makes the airship lighter in relation to classical rigid or semi-rigid designs, this permits limiting the dimensions of the airship.

Furthermore, thanks to its multi-compartmentalization, the hybrid airship according to the invention confers increased security since in case of damage to one of its compartments, the others continue to ensure minimum lift.

Finally, the multi-compartmentalization permits easy adaptation of the quantity of on-board lifting gas to the characteristics of the intended flight, by filling on the ground an appropriate number of compartments. This number of compartments filled with lifting gas can thus vary depending on the flight schedule, and in relation to the needs of each mission.

The invention also has the following optional characteristics, either singly or in combination.

Said means of propulsion include one or more engines, preferentially mounted on pivots along the transversal axis of the hybrid airship. This permits changing the angle of incidence of the airship and equally the lateral control of the latter by applying different pivoting movements to the engines located either side of the median plane. This lateral control can alternatively, or simultaneously, be effected by applying different rotation speeds to the engines.

Said flexible exterior envelope forms a wing or two semi-wings, whose shape is maintained at least in part by the air/lifting gas located in the primary enclosure and compartments $C_i$.

Said primary enclosure is centered in the airship and a series of compartments $C_i$ extend either side of the primary enclosure, in a transversal direction of the airship.

In this case, the two series of compartments $C_i$ are constructed symmetrically in relation to the symmetrical plane of the airship.

According to a first preferred embodiment of the invention, the means of communication $V_i$ comprise, for each elastic wall $P_i$, an associated electrovalve built into elastic wall $P_i$.

The airship also comprises an air exit electrovalve associated with compartment $C_{J+1}$, and configured to stop/allow communication of air between compartment $C_{J+1}$ and the exterior of the airship.

In the first preferred embodiment of the invention, said means of control are configured so that during the ascent phase, with the means of communication $V_i$ in a closed configuration so that the lifting gas exerts on wall $P_i$ a pressure capable of exerting an elastic deformation of wall $P_i$, the means of communication $V_{i+1}$ to $V_{J+1}$ as well as said electrovalve is maintained in an open configuration. This permits the evacuation of the air by the latter compartment $V_{J+1}$, during the expansion of the lifting gas. In this regard, given that the pressure of the interior of the airship must be slightly superior to the external pressure in order to maintain its aerodynamic shape, the open configuration of the communication means must be modulated to retain such slight internal pressure.

In a second preferred embodiment, the hybrid airship comprises a fluid conduit on the exterior of the airship, and a means of communication $V_i$, for each elastic wall $P_i$ from i ranging to 1 to J+1:

an intermediate electrovalve $V_{int\ i}$ mounted on the fluid conduit;

an electrovalve $V'_{i-1}$ on one side connected upstream of the intermediate electrovalve $V_{int\ i}$ in relation to the direction of flow to the exterior of the airship, and on the other side communicating with compartment $C_{i-1}$ or the primary enclosure for i=1; and an electrovalve $V'_i$ on one side connected downstream of the intermediate electrovalve $V_{int\ i}$ in relation to a direction of flow towards the exterior of the airship, and on the other side communicating with compartment $C_i$.

In this second preferred embodiment, said means of control are configured so that during the ascent phase, the maintaining in closed configuration of the means of communication $V_i$, controlled so that the lifting gas exerts on wall $P_i$ a pressure capable of producing an elastic deformation of wall $P_i$, is ensured by maintaining in closed configuration said electrovalve $V'_{i-1}$ and/or said intermediate electrovalve $V_{int\ i}$, and by maintaining said electrovalve $V'_i$ in an open configuration. This permits the air contained in compartment $C_i$ to escape via electrovalve $V'_i$ in direction of the fluid conduit, in order to be extracted from the airship.

Said means of control are then preferably configured so that in an ascent phase, with the means of communication $V_i$ in a closed configuration so that the lifting gas exerts on wall $P_i$ a pressure capable of exerting an elastic deformation on wall $P_i$, the intermediate electrovalve $V_{int\ i+1}$ to $V_{int\ J+1}$ being maintained in open configuration.

Here equally, the open configurations of the means of communication must be modulated to retain a slight overpressure inside the airship.

Whatever the implementation envisaged, the hybrid airship preferably comprises a means of introducing air into compartment $C_{J+1}$, during the descent phase of the hybrid airship, and during which the lifting gas shrinks with the loss of altitude.

Said flexible exterior envelope is manufactured in a less flexible material than that of said elastic walls, the latter being preferentially an elastomer material.

The invention finally has as object a hybrid airship control procedure as described above, and implemented so that:

(a) during an ascent phase with the lifting gas retained by one of the walls $P_i$ with i anywhere between 1 and J, the means of communication $V_i$ are maintained closed so that the lifting gas, expanding with the altitude, exerts on wall $P_i$ a pressure producing an elastic deformation of wall $P_i$ from a nominal position to a maximum deformation position in which it flattens against wall $P_{i+1}$ reducing the volume of compartment $C_i$ substantially to zero, thanks to the evacuation of the air initially occupying this compartment $C_i$;

(b) then when wall $P_i$ is in the position of maximum deformation, the means of communication $V_i$ are opened so that wall $P_i$ returns to its nominal position, via an automatic rebalancing of the pressures of the lifting gas on either side of this wall $P_i$;

(c) then, as necessary, during the continuation of the ascent phase and after return of wall $P_i$ to its nominal position, the actions (a) and (b) are repeated for wall $P_{i+1}$ as many times as necessary as long as i remains less than or equal to J.

Other advantages and characteristics of the invention will appear in the detailed and non-limitative description given below.

BRIEF OF DESCRIPTION OF THE DRAWINGS

This description relates to the drawings in the Appendix and in which.

DETAIL DESCRIPTION OF PREFERRED EMBODIMENTS

Figure 1:
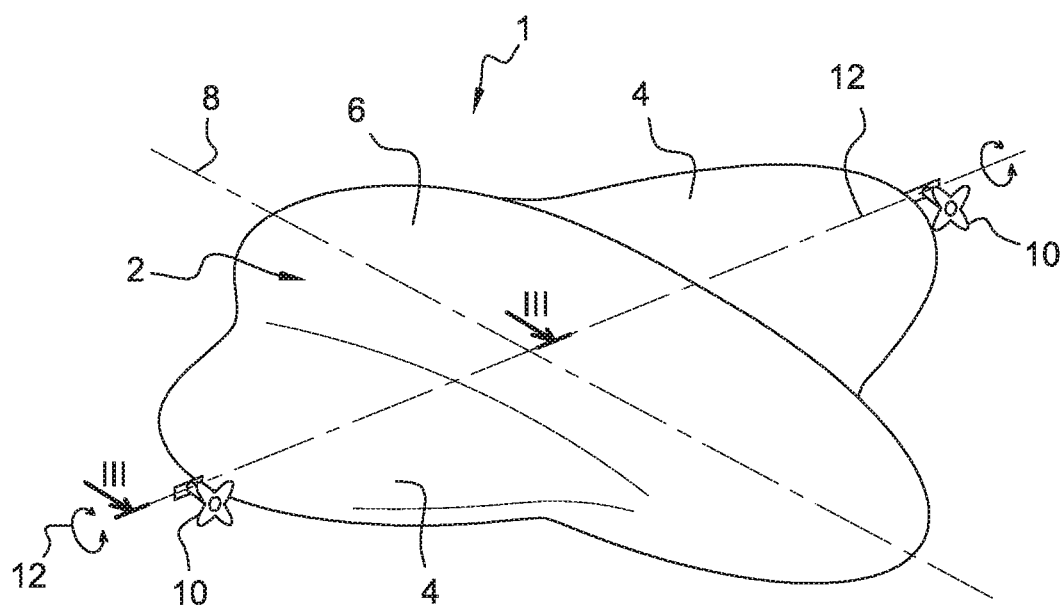
FIG. 1 shows a perspective view of a hybrid airship according to the preferred embodiment of the invention.

In FIG. 1 is shown a hybrid airship according to the first preferred embodiment of the invention. The airship has a flexible external envelope 2 defining one or more aerodynamic surfaces, here with two semi-wings 4 located either side of the central part 6 of the airship which extends along longitudinal axis 8.

Figure 2:
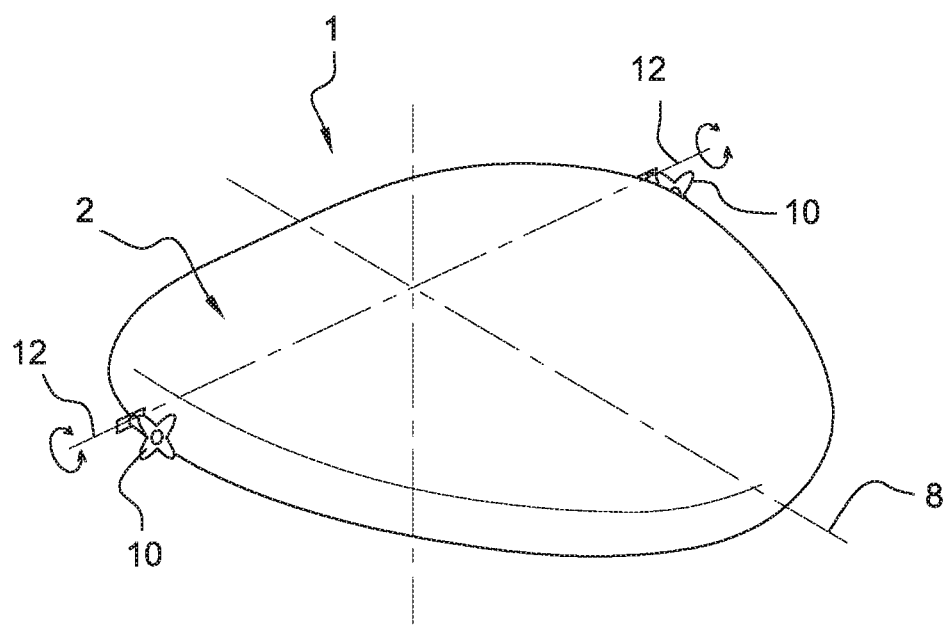
FIG. 2 shows a perspective view of a hybrid airship in an alternative embodiment.

In this first preferred embodiment, an engine 10 is mounted at the end of each semi-wing 4. Alternatively, these engines could be mounted at the rear or front of the hybrid airship. Each engine 10 pivots on transversal axis 12 of the airship, this axis 12 being orthogonal to axis 8 and preferably corresponding to the pitch axis of the airship. In an alternative embodiment shown in FIG. 2, the flexible external envelope 2 forms a single wing, still with engines 10 mounted laterally, forwards or at the rear.

Thanks to the pivoting of engines 10, the airship can easily change angle to descend or ascend to the desired altitude. Moreover, the pivoting can be extended into a vertical position, during take-off or landing phases.

The lateral control of the airship 1 can be effected by varying the speed of rotation of the two engines 10, and/or by varying their pivoting around axis 12.

In the first embodiment, the airship 1 does not comprise a mobile aerodynamic element, such as a leading edge mobile flap, or similar. Nevertheless, this type of element could be implemented, without departing from the framework of the invention. The aerodynamic lift sought with airship 1 according to the first preferred embodiment is thus obtained thanks to the semi-wings 4 and engines 10 of variable inclination.

However, the hybrid character of airship 1 results from the fact that its lift is not only aerodynamic but also aerostatic, thanks to the volume of lifting gas on-board, for example helium.

It shall be noted that the proportion of aerostatic and aerodynamic lift is spread in relation to the useful payload carried, as well as the service ceiling of the airship's mission. Ideally, the proportion of aerostatic lift tends to balance the weight of the empty structure. In fact, it is interesting to retain an aerostatic lift slightly inferior to the weight of the empty structure, i.e., without a useful payload, in order to avoid difficulties such as a spontaneous take-off of the airship during the ground phases of loading/unloading. Thus, engines 10 essentially serve to lift the useful payload, but also provide forward movement and steering, as described above.

Figure 3:
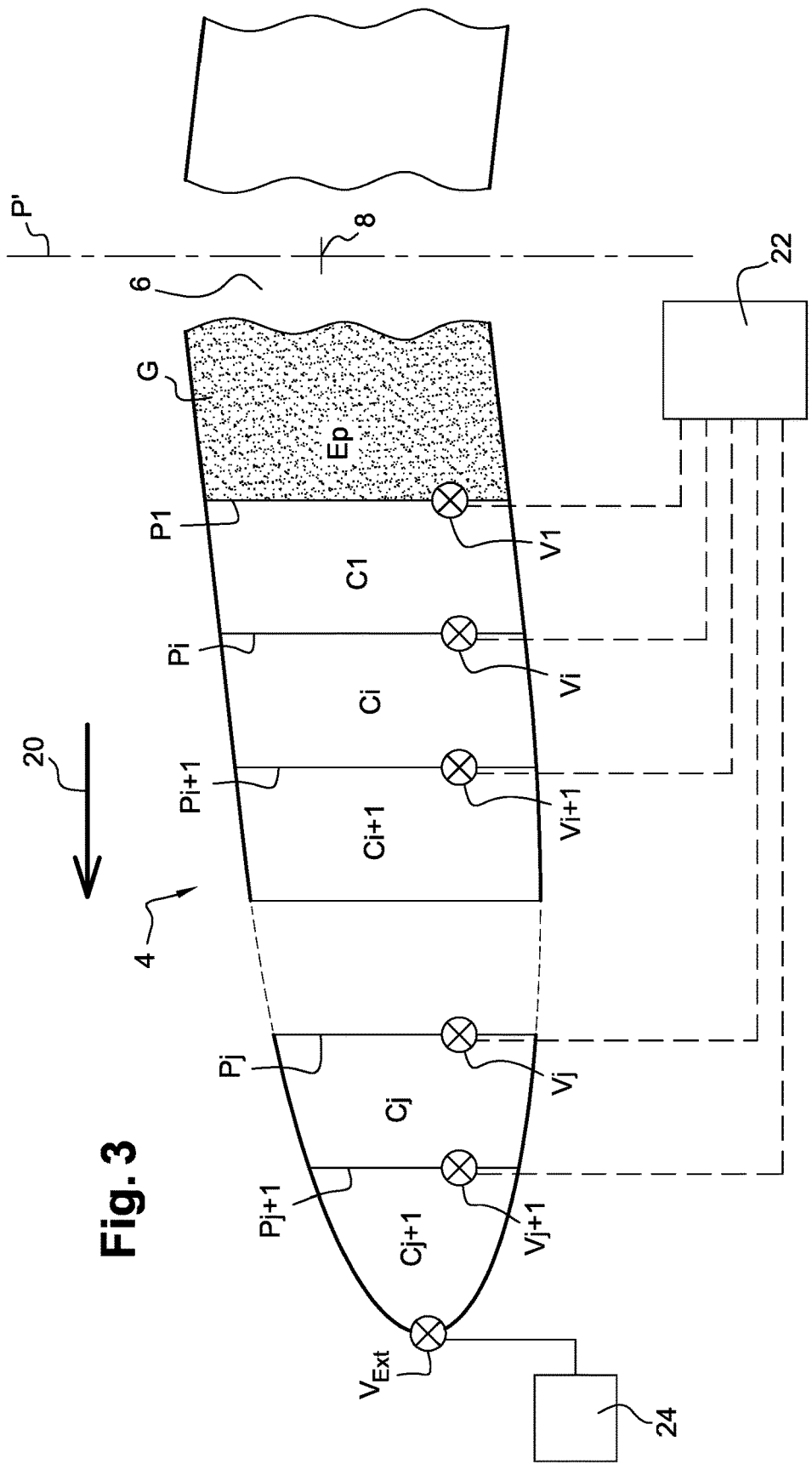
FIG. 3 shows a diagram of part of the hybrid airship shown in FIG. 1, in cross-section along the length of line III-III in FIG. 1.

FIG. 3 shows one of the two semi-wings 4 of the airship, it being understood that the other wing is produced in a symmetrical manner, in relation to the vertical and longitudinal median plane P' of the airship, and according to the symmetrical plane of the airship. Plane P' traverses the central part 6, that houses the primary enclosure Ep filled with lifting gas G. On either side of this primary enclosure Ep, are respectively two series of compartments $C_i$, the two series forming the semi-wings 4 and being symmetrically arranged in the median plane P'.

Each series thus comprises several successive compartments according to the direction of the wingspan, the direction of span corresponding to the transversal direction of the airship and represented by arrow 20. In the direction of the wingspan 20 from the center outwards, is thus successively foreseen the primary enclosure Ep then compartments $C_1$, $C_i$, $C_{i+1}$, $C_J$ and $C_{J+1}$, where the number J corresponds to a whole number greater than or equal to 1. Similar to the primary enclosure Ep, each compartment is bounded at top and bottom by the flexible exterior envelope. Laterally, these same compartments are delineated by elastic walls preferably made from an elastomer material, more flexible than the material used for the exterior envelope 2. Furthermore, each compartment preferably extends the whole width of the wing, according to longitudinal axis 8.

More precisely, primary enclosure Ep is bounded by an elastic wall $P_1$ separating this enclosure from compartment $C_1$. The latter possesses an elastic wall $P_i$ separating compartment $C_1$ from compartment $C_i$. In a similar manner, compartment $C_i$ possesses an elastic wall $P_{i+1}$ separating compartment $C_i$ from compartment $C_{i+1}$, and so on up until elastic wall $P_{J+1}$ separating compartment $C_J$ from compartment $C_{J+1}$. As previously stated, J is greater than or equal to 1, but the total number of compartments is preferably greater than 2, for example between 2 and 15. It will be apparent, that each elastic wall must be sufficiently deformable in order to be able to flatten against the directly adjacent walls. Consequently, the total number of compartments particularly depends on the maximum elastic extension of the selected material to form these walls in the form of membranes. It equally depends on the nature of the flight of the hybrid airship since if the missions envisaged include small or large variations in altitude, the number of compartments should be respectively reduced or increased. In fact, the lifting gas G is required to successively penetrate the different compartments and accompany its expansion with altitude, without being released into the atmosphere.

The hybrid airship comprises a means of communication $V_i$ between each compartment $C_i$ and its adjacent compartment $C_{i+1}$. In this first preferred embodiment, the means of communication $V_i$ is incorporated into the associated elastic walls $P_i$, and preferably takes the form of an electrovalve. Moreover, an air exit valve $V_{ext}$ is associated with compartment $C_{J+1}$, this electrovalve being configured to authorise/ stop the communication of air between compartment $C_{J+1}$ and the exterior of the airship.

The ensemble of these electrovalves $V_i$, $V_{ext}$ are commanded by means of control 22 on-board the airship, or permitting a remote control of the airship.

In a ground moored state as shown in FIG. 3, lifting gas G has a reduced volume confined in primary enclosure Ep, while the compartments are filled with air. In the case of a flight at low altitude during which the expansion of the lifting gas shall be measured, the lifting gas G may equally be introduced into several compartments adjacent to the primary enclosure Ep, with the aim of increasing the aerostatic lift. In any case, whether moored on the ground or in flight, the shape of the semi-wings are maintained in part by air and the lifting gas filling their compartments as well as that of the primary enclosure. Moreover, the shape and arrangement of the compartments are such that the forces on the elastic walls, issuing from differences in pressure between the compartments, are balanced by the tension of the exterior flexible envelope issuing from external aerodynamic pressure and the internal pressure air or lifting gas, and by the forces generated by the flexing of the wing.

Finally, the hybrid airship comprises a means 24 for the introduction of air into compartment $C_{J+1}$, useful during the descent phase of the hybrid airship when the lifting gas shrinks with the loss of altitude. Means 24 may take the form of a simple low power pump, or an air circuit taking and conducting exterior air under pressure, for example with the aid of a scoop system. The intake of air under pressure may be carried out downstream of the thrust generated by the engines.

Now shall be described the operating principle of the invention in relation to FIG. 3. More specific examples will be provided later for the other Figures.

One of the characteristics of the invention is the management of the ascent phase of the airship, during which control means 22 are configured in the following way:

(a) when lifting gas G is retained by one of the walls $P_i$, the means of communication $V_i$ are maintained closed so that the lifting gas, expanding with altitude, exerts on wall $P_i$ a pressure capable of producing an elastic deformation of wall $P_i$ from a nominal position to a maximum deformation position in which it flattens itself against wall $P_{i+1}$ reducing the volume of compartment $C_i$ substantially to zero, via an evacuation of the air initially in this compartment $C_i$;

(b) when wall $P_i$ is in a position of maximum deformation, the means of communication $V_i$ is opened so that wall $P_i$ resumes its nominal position, via an automatic rebalancing of the pressure of the lifting gas on either side of wall $P_i$;

(c) then, as necessary, during continuation of the ascent phase and after return of wall $P_i$ to its nominal position, actions (a) and (b) are repeated for wall $P_{i+1}$ as many times as necessary as long as i remains less than or equal to J.

In this manner, the invention astutely accompanies the increasing volume of the lifting gas, resulting from its expansion caused by an ascent in altitude. A somewhat similar reverse principle accompanies the shrinking of the lifting gas during the descent phases, as shall be described hereafter with specific examples.

First, in reference to FIGS. 4a to 4h, the internal behaviour of the wing is shown during an ascent phase from the ground. This example is based on the first preferred embodiment of the invention. In an arbitrary manner, and with the aim of limiting the length of the descriptions, the number of compartments is limited to four, which corresponds to said number J equaling 3.

Figure 4A:
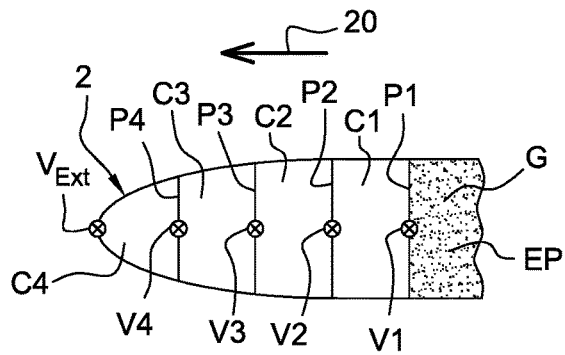
FIGS. 4a to 4h show the principle of the invention in which compartments of the airship fill with lifting gas, during the ascent phase of the airship.
Figure 4E:
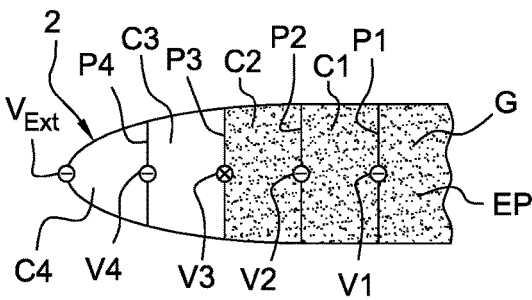

The ground moored configuration is shown in FIG. 4a, whereby four compartments $C_1$ to $C_4$ are filled with air, and the primary enclosure Ep is filled with lifting gas G. All the elastic walls $P_1$ to $P_4$ are in nominal, i.e. not or little deformed, and having a largely vertical flat shape.

Figure 4B:
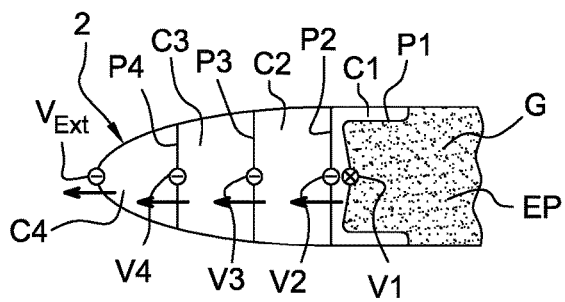

When the ascent phase begins, the electrovalves $V_2$ to $V_4$ are maintained in an open configuration, as is the air exit electrovalve $V_{ext}$ as shown in FIG. 4b. Only electrovalve $V_1$ is maintained in a closed configuration, so that under the effect of expansion of lifting gas G in the primary enclosure Ep, wall $P_1$ which delimits this enclosure is elastically deformed until reaching its maximum deformation shown in FIG. 4b. In this position of maximum deformation, wall $P_1$ flattens itself against the exterior envelope 2 and against elastic wall $P_2$, in such a way that compartment $C_1$ is substantially reduced to zero. This is made possible by the evacuation of the air contained in compartment $C_1$, this air being forced towards compartment $C_2$ by electrovalve $V_2$ being open. Nevertheless, a slight overpressure is retained to ensure the aerodynamic shape, but this is limited and controlled. All the electrovalves located downstream are open and thus permit the air to transit via compartment $C_3$ then via compartment $C_4$, before being expelled from the wing into the atmosphere. The movement of the air is shown by the arrows in FIG. 4b.

When wall $P_1$ is in its position of maximum deformation, electrovalve $V_2$ is tripped to a closed configuration while electrovalve $V_i$ is reopened. Wall $P_1$ then returns to its nominal position as shown in FIG. 4c, via automatic rebalancing of the pressures of lifting gas G on either side of wall $P_1$.

Figure 4F:
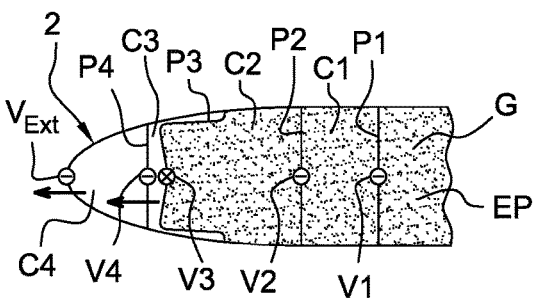
Figure 4C:
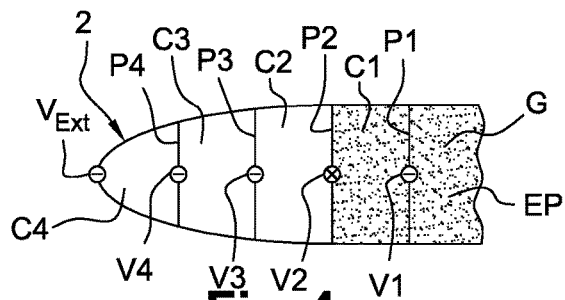
Figure 4G:
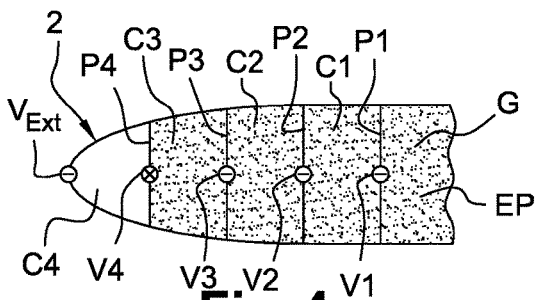
Figure 4D:
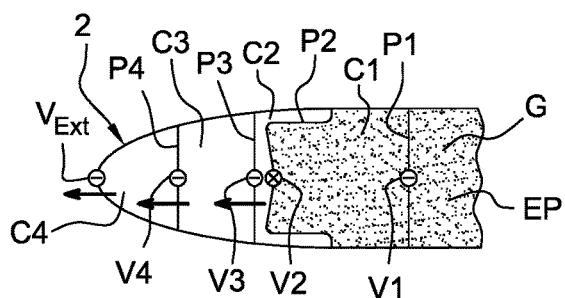

Then, as the ascent phase continues, electrovalves $V_3$ and $V_4$ are in an open configuration, as is air exit electrovalve $V_{ext}$ and electrovalve $V_i$, as shown in FIG. 4d. Only electrovalve $V_2$ is maintained in closed, so that under the effect of expansion of lifting gas G in compartment $C_1$, wall $P_2$ that delimits this compartment elastically deforms until its maximum deformation position as shown in FIG. 4d. In this position of maximum deformation, wall $P_2$ flattens itself against the exterior envelope 2 and against elastic wall $P_3$, in such a way that compartment $C_2$ is substantially reduced to zero. This is made possible by the evacuation of the air contained in compartment $C_2$, this air being forced towards compartment $C_3$ by the open electrovalve $V_3$. Nevertheless, a slight overpressure is retained to ensure the aerodynamic shape, but this is limited and controlled. All electrovalves located downstream are open and thus permit the air to transit via compartment $C_4$, before being expulsed outside the wing into the atmosphere. The movement of the air is shown by the arrows in FIG. 4d. In this Figure, elastic wall $P_1$ has been shown in its nominal non-deformed position. However, in reality, it may undergo slight deformation produced by lifting gas G in the primary enclosure Ep, even if it communicates with compartment $C_1$ via open electrovalve $V_1$.

When wall $P_2$ is in its position of maximum deformation, electrovalve $V_3$ is tripped to a closed configuration while electrovalve $V_2$ is reopened. Wall $P_2$ then returns to its nominal position as shown in 4e, via automatic rebalancing of the pressure of lifting gas G on either side of wall $P_2$.

During continuation of the ascent phase, electrovalve $V_4$ in an open configuration, as is the air exit electrovalve $V_{ext}$ and electrovalves $V_1$ and $V_2$, as shown in FIG. 4f. Only electrovalve $V_3$ is maintained closed, so that under the effect of the expansion of lifting gas G in compartment $C_2$, wall $P_3$ that delimits this compartment elastically deforms until the maximum deformation position shown in FIG. 4e. In this position of maximum deformation, wall $P_3$ flattens itself against the exterior envelope 2 and against elastic wall $P_4$, in such a way that compartment $C_3$ is substantially reduced to zero. This is made possible by the evacuation of the air contained in compartment $C_3$, this air being forced towards compartment $C_4$ by open electrovalve $V_4$. Nevertheless, a slight overpressure is retained to ensure the aerodynamic form, but this is limited and controlled. The air can thus be expulsed outside the wing into the atmosphere. The movement of the air is shown by the arrows in FIG. 4f. In this Figure, elastic walls $P_1$ and $P_2$ have been shown in their nominal non-deformed position. However, in reality they may undergo slight deformation due to lifting gas G in primary enclosure Ep and in the first compartment $C_1$.

When wall $P_3$ is in its position of maximum deformation, electrovalve $V_4$ is tripped to a closed configuration while electrovalve $V_3$ is reopened. Wall $P_2$ then returns to its nominal position as shown in FIG. 4g, via automatic rebalancing of the pressure of lifting gas G on either side of wall $P_3$.

Figure 4H:
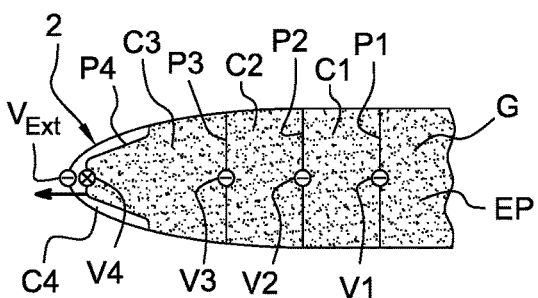

At the end of the ascent phase, the air exit electrovalve $V_{ext}$ is in an open configuration, as are electrovalves $V_1$ to $V_3$, as shown in FIG. 4h. Only electrovalve $V_4$ is maintained closed, so that under the effect of the expansion of lifting gas G in compartment $C_3$, wall $P_4$ that delimits this compartment elastically deforms to the maximum deformation position shown in FIG. 4h. In this position of maximum deformation, wall $P_3$ flattens itself against the exterior envelope 2, in such a way that the volume of compartment $C_4$ is substantially reduced to zero. This is made possible by the evacuation of the air contained in compartment $C_4$, this air in fact being expulsed outside the wing via air exit electrovalve $V_{ext}$. The movement of the air is shown by the arrow in FIG. 4h. In this Figure, elastic walls $P_1$ to $P_3$ have been shown in their nominal non-deformed position. However, they may in reality undergo a slight deformation produced by lifting gas G in the primary enclosure Ep and in compartments $C_1$ and $C_2$.

Compartment $C_4$ is not intended to be filled by lifting gas, in order to avoid the mixing of lifting gas G and air. The descent phase following the previously described ascent phase is largely carried out in a reverse manner, being somewhat assisted by means 24 aiding in the introduction of air into compartment $C_4$. This descent phase will now be described in reference to FIGS. 5a to 5f.

Figure 5A:
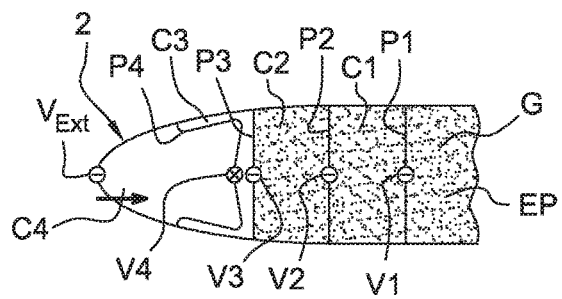
FIGS. 5a to 5f show the principle of the invention in which the compartments of the airship empty one after another of lifting gas, during the descent phase of the airship.
Figure 5D:
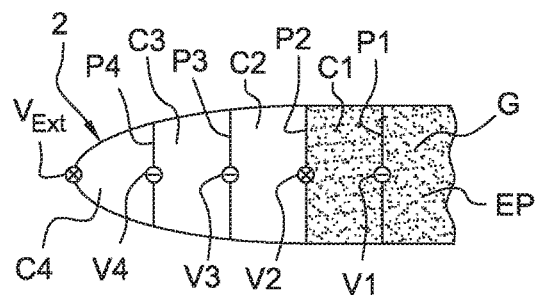
Figure 5B:
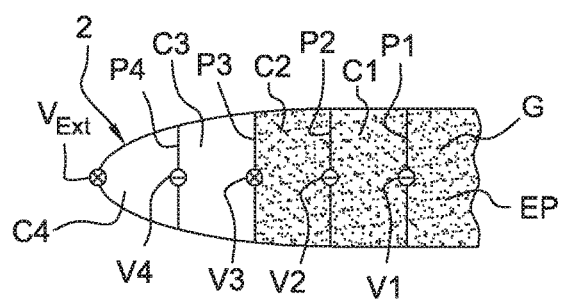

The electrovalves are in the same configurations as those in FIG. 4h, particularly electrovalve $V_4$ that adopts a closed configuration. Under the effect of the loss of altitude, the lifting gas G shrinks at the same time as the exterior air penetrates compartment $C_4$, via electrovalve $V_{ext}$. This leads wall $P_4$ to return to its nominal position, then to deform in the reverse direction in the direction of wall $P_3$. Wall $P_4$ that delimits compartment $C_3$ elastically deforms up to a position of maximum reverse deformation as shown in FIG. 5a. In this position of maximum reverse deformation, wall $P_4$ flattens against exterior envelope 2 and wall $P_3$, in such a way that the volume of compartment $C_3$ is substantially reduced to zero. This is made possible by the introduction of exterior air into compartment $C_4$, via exit air electrovalve $V_{ext}$. The movement of the air is shown by the arrow in FIG. 5a.

When wall $P_4$ is in its maximum reverse deformation position, electrovalve $V_3$ is tripped to a closed configuration while electrovalve $V_4$ is reopened. Wall $P_4$ then returns to its nominal position as shown in 5b, via automatic rebalancing of the air pressure on either side of this wall $P_4$. During this rebalancing, the air exit electrovalve $V_{ext}$ may be in either an open or closed configuration.

As the descent continues, under the effect of the loss of altitude, lifting gas G shrinks at the same time as the exterior air penetrates compartment $C_4$ via electrovalve $V_{ext}$, then into compartment $C_3$ via electrovalve $V_4$ in an open configuration. This leads wall $P_3$ to return to its nominal position, then to deform in the reverse direction in the direction of wall $P_2$. Wall $P_3$ which delimits compartment $C_2$ elastically deforms to its maximum reverse deformation position shown in FIG. 5c. In this position of maximum reverse deformation, wall $P_3$ flattens against exterior envelope 2 and wall $P_2$, in such a way that the volume of compartment $C_2$ is substantially reduced to zero. This is made possible by the introduction of exterior air into compartments $C_4$ and $C_3$, as shown by the arrows in FIG. 5c.

When wall $P_3$ is in its maximum reverse deformation position, electrovalve $V_2$ is tripped to a closed configuration while electrovalve $V_3$ is reopened. Wall $P_3$ returns to is nominal position shown in FIG. 5d, via automatic rebalancing of the air pressure either side of wall $P_3$. During this rebalancing, air exit electrovalve $V_{ext}$ may be either open or closed, as is the case with electrovalve $V_4$.

Figure 5E:
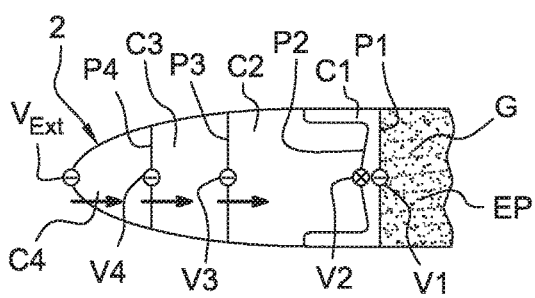
Figure 5C:
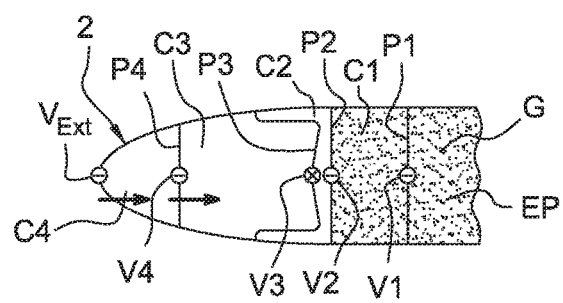
Figure 5F:
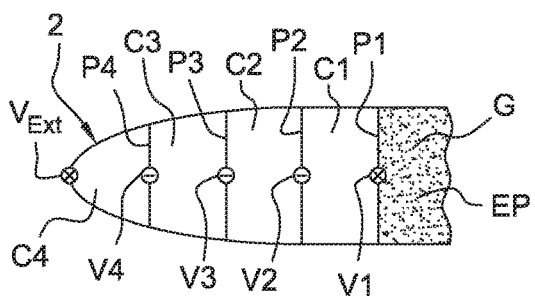

As the descent continues, under the effect of the loss of altitude lifting gas G shrinks as the exterior air penetrates into compartment $C_4$ via electrovalve $V_{ext}$, then into compartments $C_3$ and $C_2$ via electrovalves $V_4$ and $V_3$ in an open configuration. This leads wall $P_2$ to return to its nominal position, then to deform in the reverse direction in the direction of wall $P_1$. Wall $P_2$ which delimits compartment $C_1$ elastically deforms until a maximum reverse deformation position as shown in FIG. 5e. In this position of maximum reverse deformation, wall $P_2$ flattens against exterior envelope 2 and wall $P_1$, in such a way that the volume of compartment $C_1$ is substantially reduced to zero. This is made possible by introduction of exterior air into compartments $C_4$, $C_3$, $C_2$, as shown by the arrows in FIG. 5e.

When wall $P_2$ is in its maximum reverse deformation position, electrovalve $V_1$ is tripped to a closed configuration while electrovalve $V_2$ is reopened. Wall $P_2$ returns to its nominal position shown in FIG. 5f, via automatic rebalancing of the air pressure either side of wall $P_2$. During this rebalancing, exit air electrovalve $V_{ext}$ can remain in either open or closed configuration, as may electrovalves $V_3$ and $V_4$.

FIGS. 6a to 6h demonstrate the principle of the invention during the ascent phase of the airship in the second preferred embodiment of the invention. This second embodiment differs from the first embodiment essentially by the design of its means of communication $V_1$, which are constructed exterior to the elastic walls.

In fact, a fluid conduit 30 is provided with one extremity close to the center sealed and the other extremity giving on to the external atmosphere. This conduit 30 is preferentially straight and oriented in the direction of the span 20.

In addition, means of communication $V_i$ associated with each elastic wall are no longer simple electrovalves in the walls, but are formed by an ensemble of three electrovalve including:

an intermediate electrovalve $V_{int}$, mounted on the fluid conduit;

an electrovalve $V'_{i-1}$ on one side connected upstream of the intermediate electrovalve $V_{int\ i}$ in relation to the direction of flow to the exterior of the airship, and on the other side communicating with compartment $C_{i-1}$ or the primary enclosure for i=1; and an electrovalve $V'_i$ on one side connected downstream of the intermediate electrovalve $V_{int\ i}$ in relation to a direction of flow towards the exterior of the airship, and on the other side communicating with compartment $C_i$.

In other words, each electrovalve $V'_i$ simultaneously belongs to means $V_i$ as well as means $V_{i+1}$.

Figure 6A:
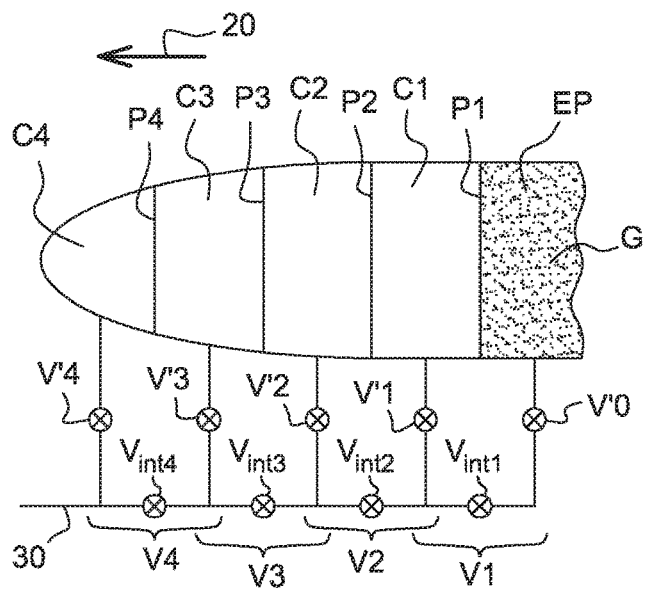
FIGS. 6a to 6h show similar views to those of FIGS. 4a to 4h, with the airship in the second preferred embodiment.

In practice, in the specific example of FIGS. 6a to 6h comprising four compartments $C_1$ to $C_4$, the configuration when on the ground is that shown in FIG. 6a, in which compartments $C_1$ to $C_4$ are filled with air, and the primary enclosure Ep filled with lifting gas G. All the elastic walls $P_1$ to $P_4$ are in the nominal position, namely not deformed or little deformed, ideally adopting a flat vertical plane.

Figure 6B:
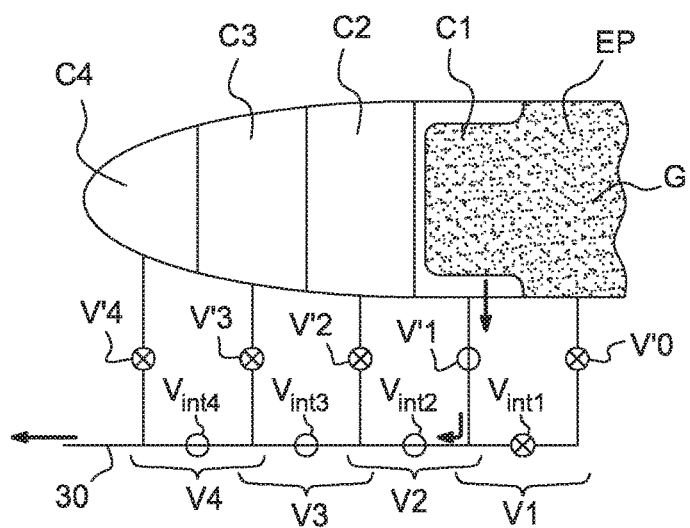

When the ascent phase begins, the intermediate electrovalves $V_{int\ 2}$ to $V_{int4}$ are open, as shown in FIG. 6b. Only means $V_i$ are closed, by closure of electrovalve $V'_D$ and intermediate electrovalve $V_{int\ 1}$. Consequently, under the effect of expansion of the lifting gas G in the primary enclosure Ep, wall $P_1$ which delimits this enclosure elastically deforms until the maximum deformation position shown in FIG. 6b. In this position of maximum deformation, wall $P_1$ flattens itself against the exterior envelope 2 and against elastic wall $P_2$, in such a way that compartment $C_1$ is substantially reduced to zero. This is made possible by the evacuation of the air contained in compartment $C_1$, this air being forced towards fluid conduit 30 by open electrovalve $V'_1$. In FIG. 6b, the arrows show the expulsion of air out of compartment $C_1$ and conduit 30.

Figure 6C:
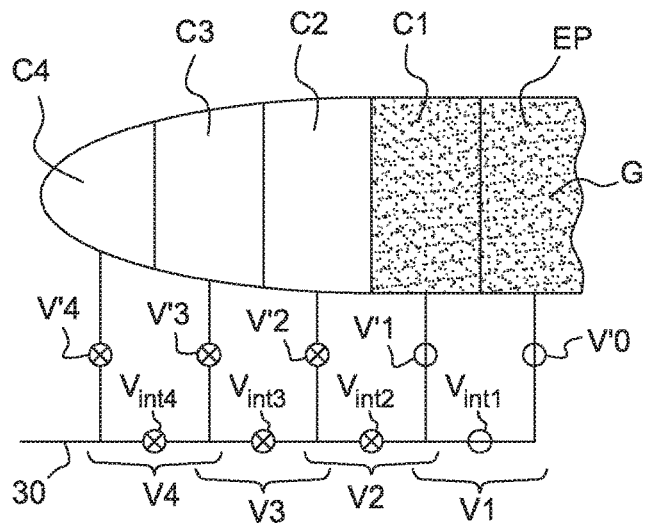

When wall $P_1$ is in its maximum deformation position, the intermediate electrovalve $V_{int\ 2}$ is tripped to a closed configuration while electrovalves $V'_D$ and $V_{int\ 1}$ are reopened in order to trip the ensemble of means $V_1$ to an open configuration. Wall $P_1$ returns to its nominal position as shown in FIG. 6c, via automatic rebalancing of the pressure of lifting gas G on either side of wall $P_1$.

Figure 6D:
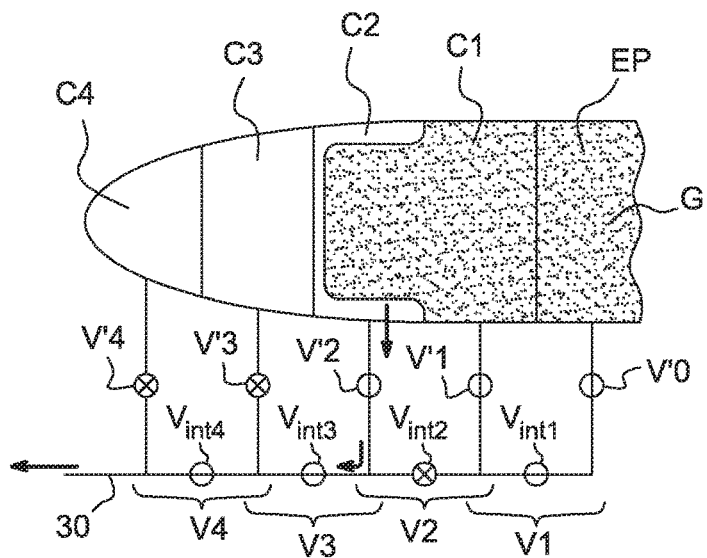

Then, as the ascent phase continues, intermediate electrovalves $V_{int\ 3}$ and $V_{int\ 4}$ remain open, as shown in FIG. 6d. Means $V_1$ are maintained open, and only means $V_2$ are maintained closed, by closure of intermediate electrovalve $V_{int\ 2}$. Consequently, under the effect of expansion of lifting gas G in compartment $C_1$, wall $P_2$ that delimits this compartment elastically deforms to its maximum deformation position shown in FIG. 6d. In this position of maximum deformation, wall $P_2$ flattens itself against the exterior envelope 2 and against elastic wall $P_3$, in such a way that compartment $C_2$ is substantially reduced to zero. This is made possible by the evacuation of the air contained in compartment $C_2$, this air being forced towards fluid conduit 30 by open electrovalve $V'_2$. In FIG. 6d, the arrows show the expulsion of air from compartment $C_2$ and conduit 30.

Figure 6E:
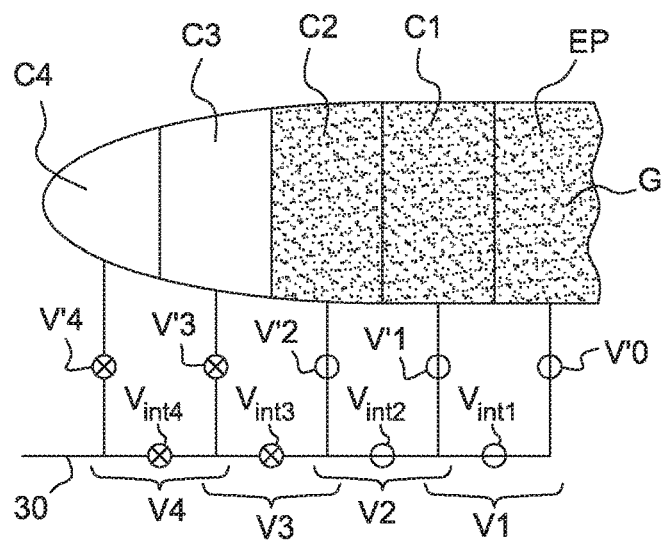

When wall $P_2$ is in its maximum deformation position, intermediate electrovalve $V_{int\ 3}$ is tripped to a closed configuration while intermediate electrovalve $V_{int\ 2}$ is reopened to trip the ensemble of means $V_2$ into an open configuration. Wall $P_1$ returns to its nominal position as shown in FIG. 6e, by automatic rebalancing of the pressure of the lifting gas G on either side of this wall $P_2$.

Figure 6F:
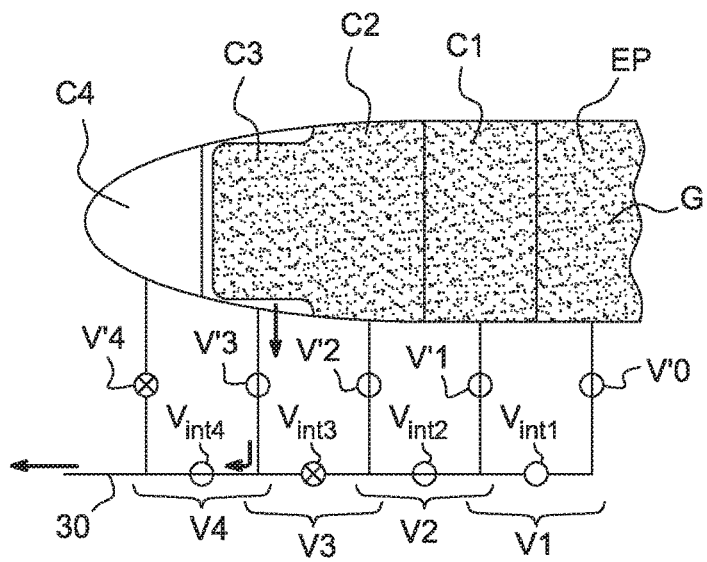

As the ascent phase continues the intermediate electrovalve $V_{int\ 4}$ remains open, as shown in FIG. 6f. Means $V_1$ and $V_2$ are maintained open and only means $V_3$ are maintained closed, by closure of the intermediate electrovalve $V_{int\ 3}$. Consequently, under the effect of expansion of lifting gas G in compartment $C_2$, wall $P_3$ which delimits this compartment elastically deforms until its maximum deformation position shown in FIG. 6f. In this position of maximum deformation, wall $P_3$ flattens itself against the exterior envelope 2 and against elastic wall $P_4$, in such a way that compartment $C_3$ is substantially reduced to zero. This is made possible by the evacuation of the air contained in compartment $C_3$, this air being forced towards fluid conduit 30 by open electrovalve $V'_3$. In FIG. 6f, the arrows show the expulsion of air from compartment $C_3$ and conduit 30.

Figure 6G:
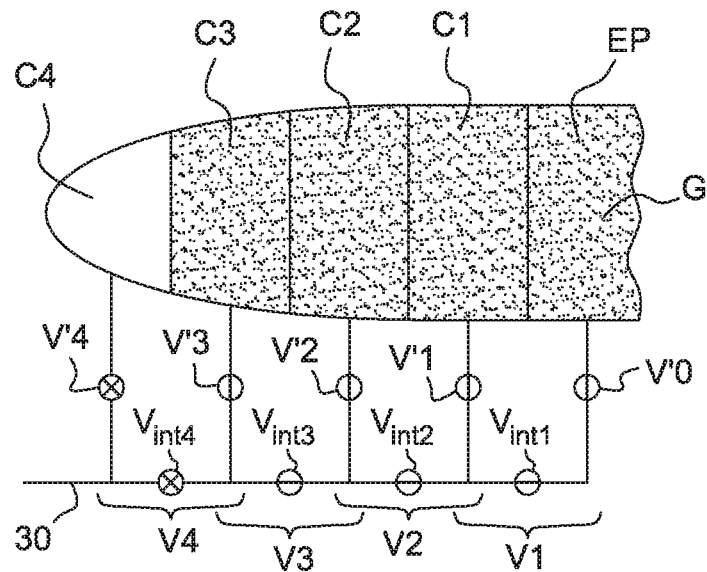

When wall $P_3$ is in the maximum deformation position, intermediate electrovalve $V_{int\ 4}$ is tripped closed, while intermediate electrovalve $V_{int}$ is reopened, in order to place the ensemble of means $V_3$ into an open configuration. Wall $P_3$ then returns to its nominal position as shown in FIG. 6g, via automatic rebalancing of the pressure of lifting gas G on either side of wall $P_3$.

Figure 6H:
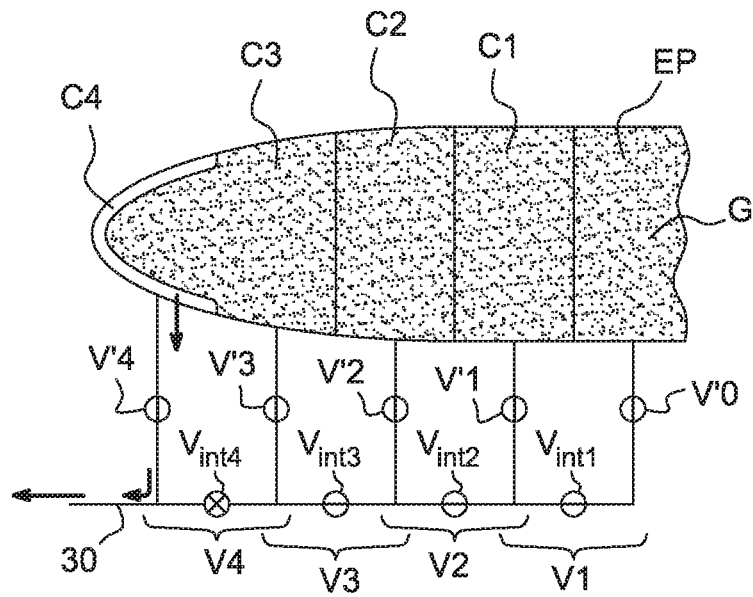

During the end of the ascent phase, means $V_1$ to $V_3$ are maintained in an open configuration as shown in FIG. 6h. Only means $V_4$ are maintained closed, by the closing of intermediate electrovalve $V_{int\ 4}$. Consequently, under the effect of the expansion of lifting gas G in compartment $C_3$, wall $P_4$ that delimits this compartment elastically deforms until its maximum deformation position shown in FIG. 6h. In this position of maximum deformation, wall $P_4$ flattens itself against the exterior envelope 2, in such a way that the volume of compartment $C_4$ is substantially reduced to zero. This is made possible by the evacuation of the air contained in compartment $C_4$, this air being forced towards fluid conduit 30 by open electrovalve $V'_4$. In FIG. 6h, the arrows show the expulsion of the air from compartment $C_4$ and conduit 30.

In this second preferred embodiment of the invention, compartment $C_4$ is no longer intended to be filled by the lifting gas, in order to avoid mixing lifting gas G and the air. In fact, the descent phase following the ascent phase previously described, is carried out in a largely reverse manner, being assisted as necessary by means 24 aiding the introduction of air into the different compartments. This descent phase shall now be described in reference to FIGS. 7a to 7f.

The means of communication $V_1$ are in the same configuration as those in FIG. 6h, and particularly means $V_4$ which adopts a closed configuration by closing of electrovalve $V_{int\ 4}$.

Figure 7A:
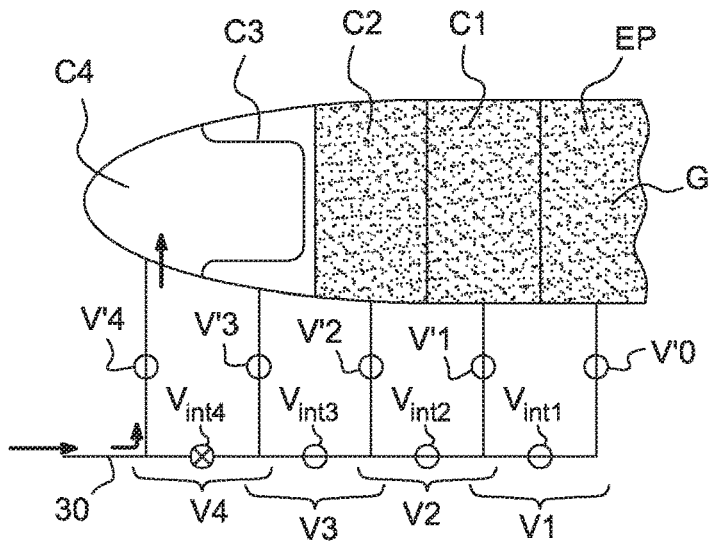
FIGS. 7a to 7f show views similar to those of FIGS. 5a to 5f, with the airship in the second preferred embodiment.

Under the effect of the loss of altitude, lifting gas G shrinks at the same time as the exterior air penetrates compartment $C_4$, via the open electrovalve $V'_4$, being where necessary assisted by means 24 aiding in the introduction of air into compartment $C_4$. This leads wall $P_4$ to return to its nominal position, then to deform in the reverse direction in the direction of wall $P_3$. Wall $P_4$ which delimits compartment $C_3$ elastically deforms up to a position of maximum reverse deformation as shown in FIG. 7a. In this position of maximum reverse deformation, wall $P_4$ flattens against exterior envelope 2 and wall $P_3$, in such a way that the volume of compartment $C_3$ is substantially reduced to zero. This is rendered possible by the introduction of exterior air into compartment $C_4$, via electrovalve $V'_4$. The movement of the air is shown by the arrow in FIG. 7a.

Figure 7B:
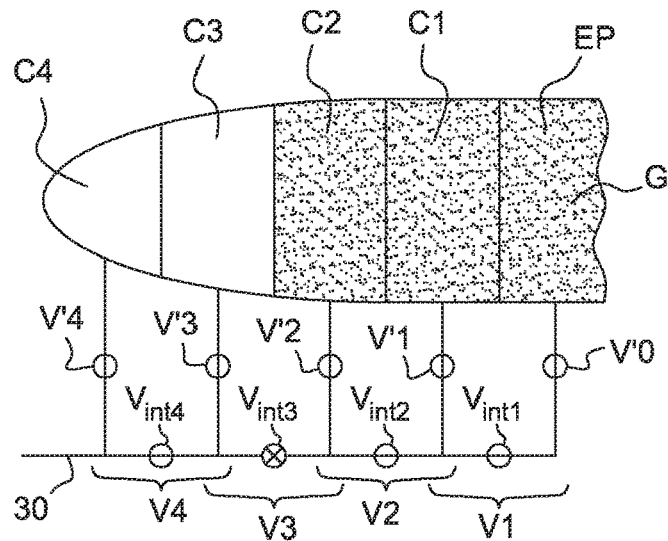
Figure 7C:
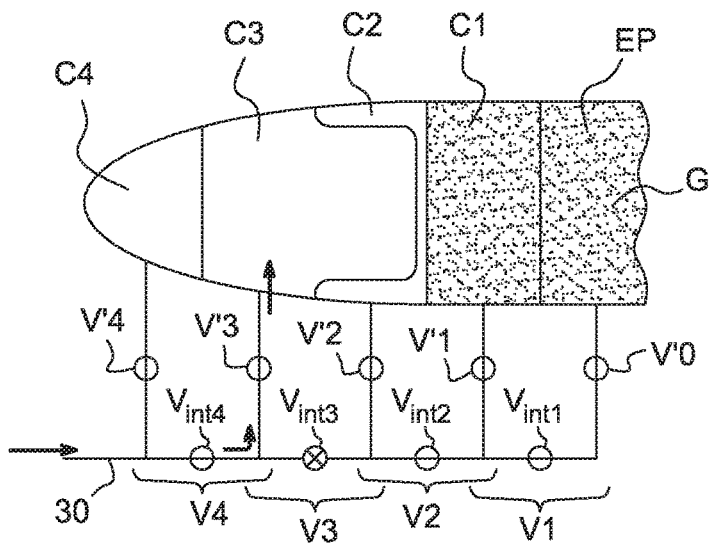

When wall $P_4$ is in the maximum reverse deformation position, intermediate electrovalve $V_{int\ 3}$ is tripped into a closed configuration, whilst means $V_4$ are tripped into an open configuration by the opening of intermediate electrovalve $V_{int\ 4}$. Wall $P_4$ returns to its nominal position as shown in FIG. 7b, via automatic rebalancing of the air pressure on either side of wall $P_4$. During this rebalancing, the means $V_1$ and $V_2$ are preferably in an open configuration.

As the descent continues, lifting gas G shrinks as the exterior air penetrates into compartment $C_3$, via open electrovalve $V'_3$. This leads wall $P_3$ to return to its nominal position, then to deform in the reverse direction in the direction of wall $P_2$. Wall $P_3$ which delimits compartment $C_2$ elastically deforms until its maximum reverse deformation position shown in FIG. 7c. In this position of maximum reverse deformation, wall $P_3$ flattens against exterior envelope 2 and wall $P_2$, in such a way that the volume of compartment $C_2$ is substantially reduced to zero. This is made possible by the introduction of exterior air into compartment $C_3$, via electrovalve $V'_3$. The movement of the air is shown by the arrows in FIG. 7c.

Figure 7D:
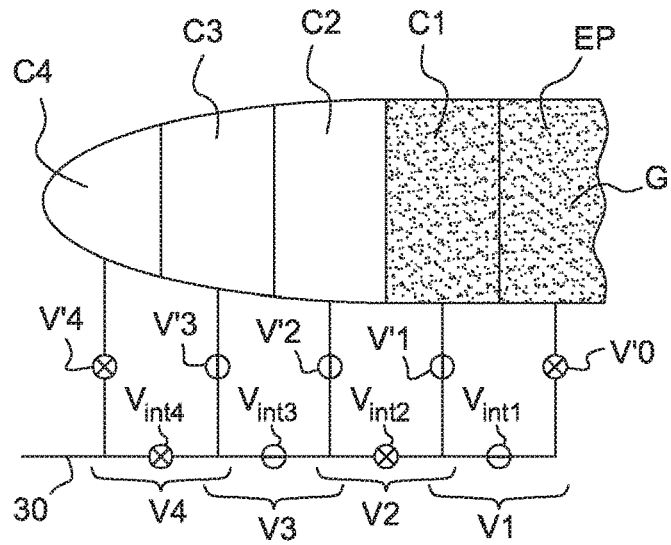
Figure 7E:
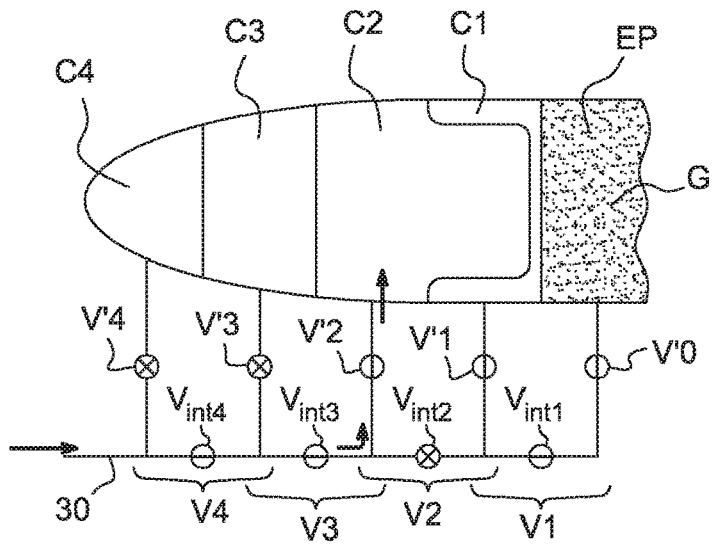
Figure 7F:
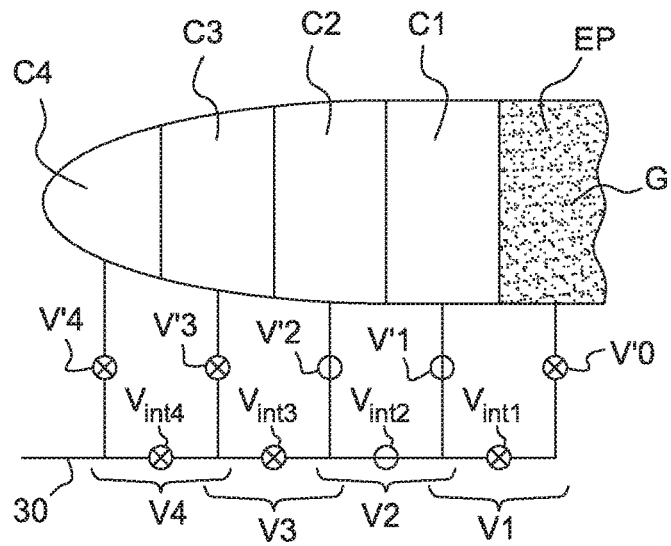

When wall $P_3$ is in the maximum reverse deformation position intermediate electrovalve $V_{int\ 2}$ is tripped into a closed configuration whilst means $V_3$ are tripped into an open configuration, by the opening of intermediate valve $V_{int\ 3}$. Wall $P_3$ returns to its nominal position as shown in FIG. 7d, via the automatic rebalancing of air pressure on either side of wall $P_3$. During this rebalancing, means $V_1$ is preferably in an open configuration.

At the end of the descent, the lifting gas G shrinks as the exterior air penetrates into compartment $C_2$, via open electrovalve $V'_2$. This leads wall $P_2$ to return to its nominal position, then to deform in the reverse direction in the direction of wall $P_1$. Wall $P_2$ which delimits compartment $C_1$ elastically deforms until its maximum reverse deformation shown in FIG. 7e. In this position of maximum reverse deformation, wall $P_2$ flattens against exterior envelope 2 and wall $P_1$, in such a way that the volume of compartment $C_1$ is substantially reduced to zero. This is made possible by the introduction of exterior air into compartment $C_2$, via electrovalve $V'_2$. The movement of the air is shown by the arrows in FIG. 7e.

When wall $P_2$ is in the maximum reverse deformation position intermediate electrovalve $V_{int\ 1}$ is tripped into a closed configuration whilst means $V_2$ are tripped into an open configuration, by the opening of intermediate valve $V_{int\ 2}$. Wall $P_2$ then returns to its nominal position shown in FIG. 7f, via automatic rebalancing of air pressure on either side of wall $P_2$.

Of course, various modifications may be made to the invention by one skilled in the art, and which is described here using non-limitative examples.

The invention claimed is:

1. A hybrid airship (1) having aerostatic and aerodynamic lift including:
    a means of propulsion (10);
    a flexible external envelope (2);
    at least one primary enclosure Ep filled with lifting gas (G), said primary enclosure Ep having an elastic wall $P_1$ separating this enclosure from compartment $C_1$, the latter having an elastic wall $P_i$ separating compartment $C_1$ from compartment $C_i$, the latter having an elastic wall $P_{i+1}$ separating the compartment $C_i$ from compartment $C_{i+1}$, and so on up until elastic wall $P_{J+1}$ separating compartment $C_J$ from compartment $C_{J+1}$ where J corresponds to a whole number greater than or equal to 1, each compartment $C_i$ being equally delimited by the flexible exterior envelope;
    a means of communication $V_i$ between each compartment $C_i$ and its adjacent compartment $C_{i+1}$;
    a means of control (22) and means of communication $V_i$;
    said means of control (22) being configured so as:
    (a) during an ascent phase with lifting gas (G) retained by one of the walls $P_i$ with i being between 1 and J, to maintain the means of communication $V_i$ in a closed configuration so that the lifting gas, expanding with the altitude, exerts on wall $P_i$ a pressure capable of producing an elastic deformation of wall $P_i$ from a nominal position to a maximum deformation position in which it flattens itself against wall $P_{i+1}$ by reducing the volume of compartment $C_i$ substantially to zero, due to an evacuation of the air initially occupying compartment $C_i$;

(b) then when wall $P_i$ is in the position of maximum deformation, to open the means of communication $V_i$ in such a way that wall $P_i$ returns to its nominal position, by automatic re-balancing of the pressure of the lifting gas on both sides of this wall $P_i$;

(c) then where appropriate, during continuation of the ascent phase and after the return of wall $P_i$ to nominal position, to repeat actions (a) and (b) for wall $P_{i+1}$ as many times as necessary as long as i remains less than or equal to J.

2. A hybrid airship according to claim 1, characterised by said means of propulsion comprising one or more engines (10), preferably mounted on pivots in the transversal axis (12) of the hybrid airship.

3. A hybrid airship according to claim 1, characterised by said flexible external envelope (2) forming a wing or two semi-wings (4), whose shape is maintained at least in part by the air/lifting gas located in the primary enclosure Ep and compartments $C_i$.

4. A hybrid airship according to claim 1, characterised in that said primary enclosure Ep is constructed in the center of the airship, and that a series of compartments $C_i$ extend either side of the primary enclosure, in a transversal direction (20) of the airship.

5. A hybrid airship according to the previous claim 4, characterised in that the two series of compartments $C_i$ are arranged symmetrically in relation to the symmetrical plane (P') of the airship.

6. A hybrid airship according to claim 1, characterised in that the means of communication $V_i$ comprise, for each elastic wall $P_i$, an electrovalve built into the associated elastic wall $P_i$.

7. A hybrid airship, according to claim 1, characterised in that it equally comprises an air exit electrovalve $V_{ext}$ associated with compartment $C_{J+1}$, and configured so as to stop/authorise communication of air between compartment $C_{J+1}$ and the exterior of the airship.

8. A hybrid airship according to claim 1, characterised in that said means of control (22) are configured so that during an ascent phase, with means of communication $V_i$ in a closed configuration so that the lifting gas (G) exerts on wall $P_i$ a pressure capable of producing an elastic deformation of wall $P_i$, said means of communication $V_{i+1}$ to $V_{J+1}$ as well as said air exit electrovalve $V_{ext}$ are maintained in an open configuration.

9. A hybrid airship according to claim 1, characterised in that it comprises a fluid conduit (30) leading to the exterior of the airship, and the means of communication $V_i$ for each elastic wall $P_i$ where i ranges from 1 to J+1:

an intermediate electrovalve $V_{int\ i}$ mounted on the fluid conduit (30);

an electrovalve $V'_{i-1}$ on one side connected upstream of the intermediate electrovalve $V_{int\ i}$ in relation to the direction of flow to the exterior of the airship, and on the other side communicating with compartment $C_{i-1}$ or the primary enclosure for i=1; and an electrovalve $V'_i$ on one side connected downstream of the intermediate electrovalve $V_{int\ i}$ in relation to a direction of flow towards the exterior of the airship, and on the other side communicating with compartment $C_i$.

10. A hybrid airship according to the previous claim 9, characterised in that said means of control (22) are configured so that during an ascent phase, the maintaining in a closed configuration of the means of communication $V_i$, controlled so that the lifting gas (G) exerts on wall $P_i$ a pressure capable of producing an elastic deformation of wall $P_i$, is ensured by maintaining in a closed configuration said electrovalve $V'_{i-1}$ and/or said intermediate electrovalve $V_{int\ i}$, and by maintaining said electrovalve $V'_i$ in an open configuration.

11. A hybrid airship according to the previous claim 10, characterised in that said means of control (22) are configured so that during an ascent phase, with the means of communication $V_i$ in a closed configuration so that the lifting gas exerts on wall $P_i$ a pressure capable of producing an elastic deformation of wall $P_i$, the intermediate electrovalves $V_{int\ i+1}$ to $V_{int\ J+1}$ are maintained in an open configuration.

12. A hybrid airship according to claim 1, characterised in that it comprises means (24) of introducing air into compartment $C_{J+1}$, during a descent phase of the hybrid airship during which lifting gas (G) shrinks with the loss of altitude.

13. A hybrid airship according to claim 1, characterised in that said flexible exterior envelope (2) is manufactured from a material less flexible than that of said elastic walls.

14. A hybrid airship according to claim 1, characterised in that said elastic walls are manufactured from an elastomer material.

15. A control procedure for the hybrid airship (1) according to claim 1, characterised in that it is implemented so that:

(a) during an ascent phase with the lifting gas retained by one of the walls $P_i$ where i is between 1 and J, the means of communication $V_i$ are maintained in a closed configuration so that the lifting gas (G), expanding with the altitude, exerts on wall $P_i$ a pressure producing an elastic deformation of wall $P_i$ from a nominal position to a maximum deformation position in that it flattens against wall $P_{i+1}$ by reducing the volume of compartment $C_i$ substantially to zero, via an evacuation of the air initially occupying this compartment $C_i$;

(b) then when wall $P_i$ is in the maximum deformation position, the means of communication $V_i$ are opened so that wall $P_i$ returns to its nominal position nominal, via automatic rebalancing of the pressure of lifting gas (G) on either side of this wall $P_i$;

(c) then, as necessary, during the continuation of the ascent phase and after return of wall $P_i$ to its nominal position, the actions (a) and (b) are repeated for wall $P_{i+1}$ as many times as necessary as long as i remains less than or equal to J.

* * * * *